United States Patent
Corona

(10) Patent No.: US 6,992,671 B1
(45) Date of Patent: Jan. 31, 2006

(54) METHOD AND APPARATUS FOR COMPRESSING BEZIER DESCRIPTIONS OF LETTERFORMS IN OUTLINE FONTS USING VECTOR QUANTIZATION TECHNIQUES

(75) Inventor: Miguel Angel Corona, Cambridge, MA (US)

(73) Assignee: Monotype Imaging, Inc., Woburn, MA (US)

( * ) Notice: Subject to any disclaimer, the term of this patent is extended or adjusted under 35 U.S.C. 154(b) by 0 days.

(21) Appl. No.: 09/536,418

(22) Filed: Mar. 28, 2000

Related U.S. Application Data

(63) Continuation-in-part of application No. 09/457,549, filed on Dec. 9, 1999, now abandoned.

(51) Int. Cl.
G06T 4/00 (2006.01)

(52) U.S. Cl. .............. 345/467; 345/468; 345/469; 345/471; 345/472; 345/472.1; 345/472.2; 382/232; 382/233; 382/246; 382/251; 382/253

(58) Field of Classification Search .............. 345/467, 345/468, 469, 469.1, 471, 472, 472.3; 382/232, 382/233, 242, 251, 253, 246
See application file for complete search history.

(56) References Cited

U.S. PATENT DOCUMENTS

| 5,428,728 A | * | 6/1995 | Lung et al. ............. 395/150 |
| 5,488,365 A | * | 1/1996 | Seroussi et al. ......... 341/106 |
| 5,583,978 A | * | 12/1996 | Collins et al. ............ 345/170 |
| 5,600,772 A | * | 2/1997 | Zhou et al. ............... 345/170 |
| 5,727,140 A | * | 3/1998 | Ohtomo et al. ........... 395/167 |
| 5,754,187 A | * | 5/1998 | Ristow et al. ............ 345/469 |
| 5,818,970 A | * | 10/1998 | Ishikawa et al. .......... 382/248 |
| 5,883,979 A | * | 3/1999 | Beretta et al. ........... 358/539 |
| 5,892,847 A | * | 4/1999 | Johnson ................... 382/232 |
| 5,982,387 A | * | 11/1999 | Hellmann ................ 345/469 |
| 6,181,825 B1 | * | 1/2001 | Ragland et al. .......... 382/239 |
| 6,229,521 B1 | * | 5/2001 | Yip ......................... 345/467 |
| 6,232,987 B1 | * | 5/2001 | Choi et al. ............... 345/467 |

* cited by examiner

Primary Examiner—Matthew Luu
Assistant Examiner—Daniel Chung
(74) Attorney, Agent, or Firm—Breiner & Breiner, L.L.C.

(57) ABSTRACT

Vector quantization provides font contour data reduction. Characters are defined in a font collection using segmented outline forms and common references stored to curve segments for similar segments in different characters of the font collection. Compressing the font collection preferably includes applying an entropy encoding data reduction. The common references are stored in a segment storage location. Another aspect includes decompressing a font store containing a compressed collection of outline fonts. The uncompressed curve segments are scaled so as to match a requested size for a letterform.

20 Claims, 11 Drawing Sheets

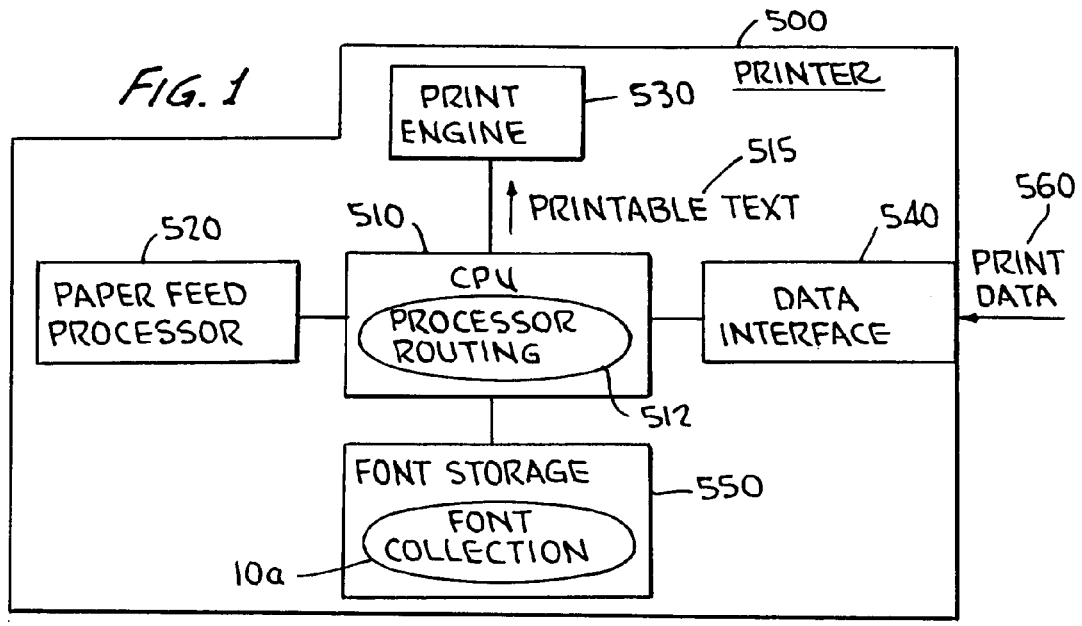
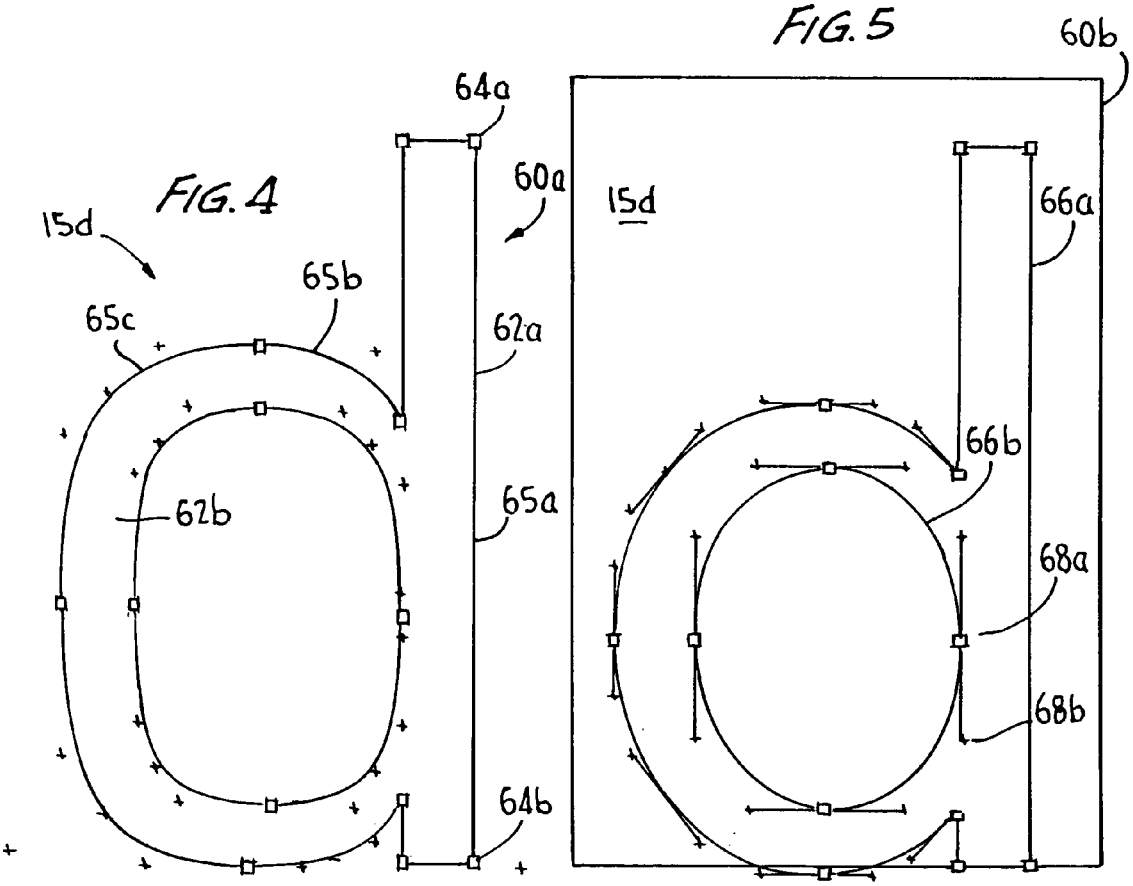

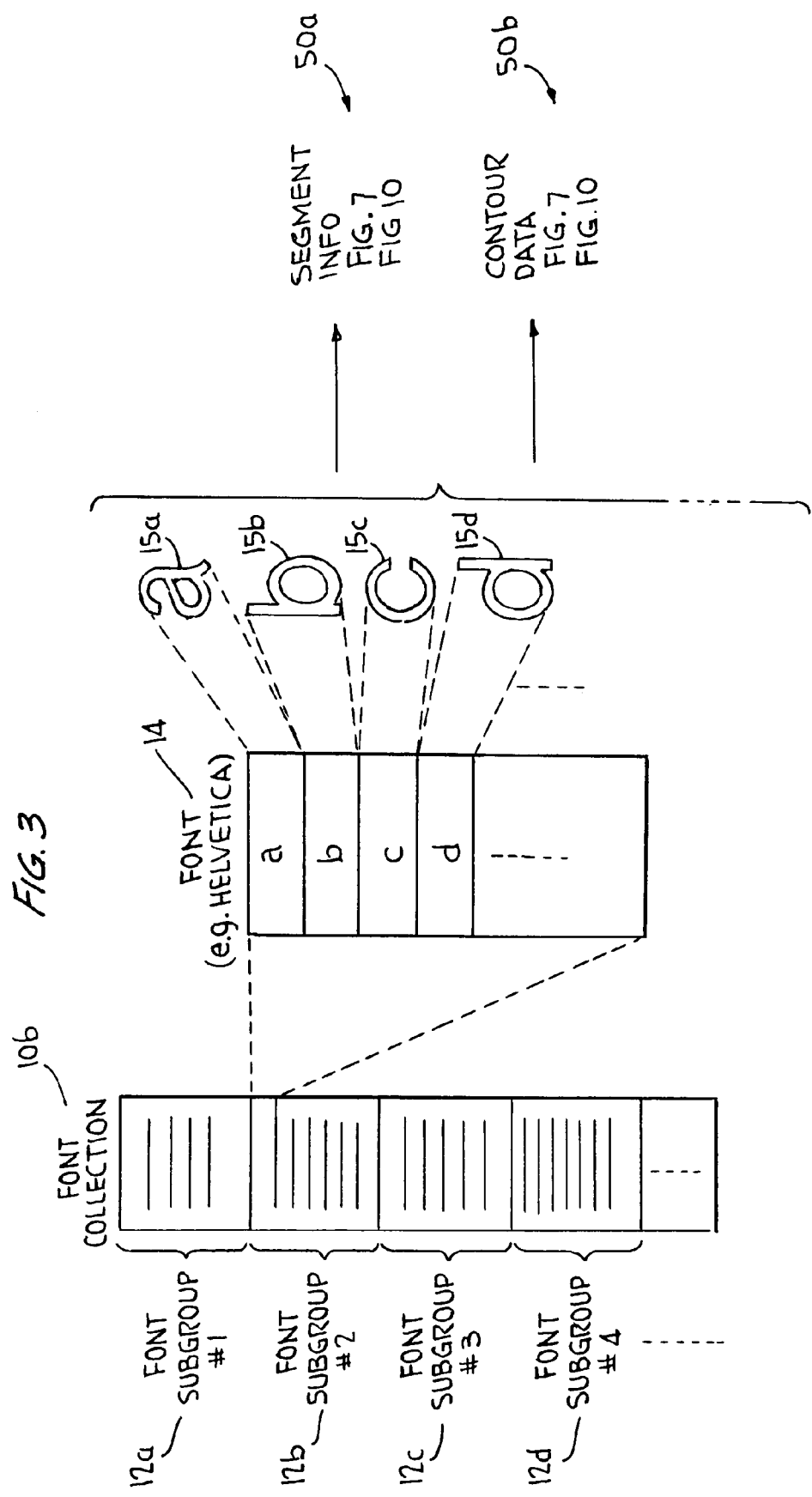

PLOT OF A LETTERFORM OUTLINE

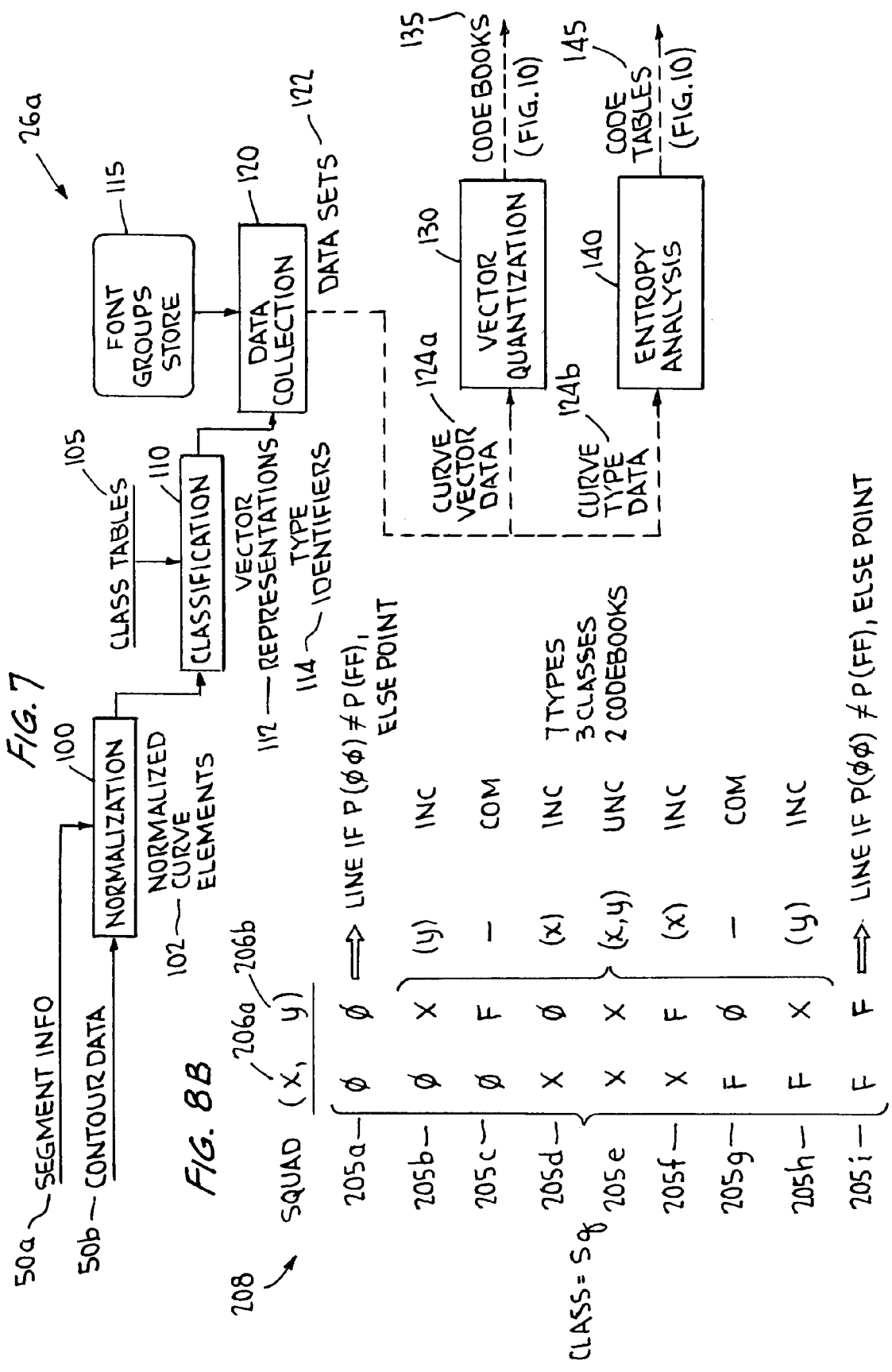

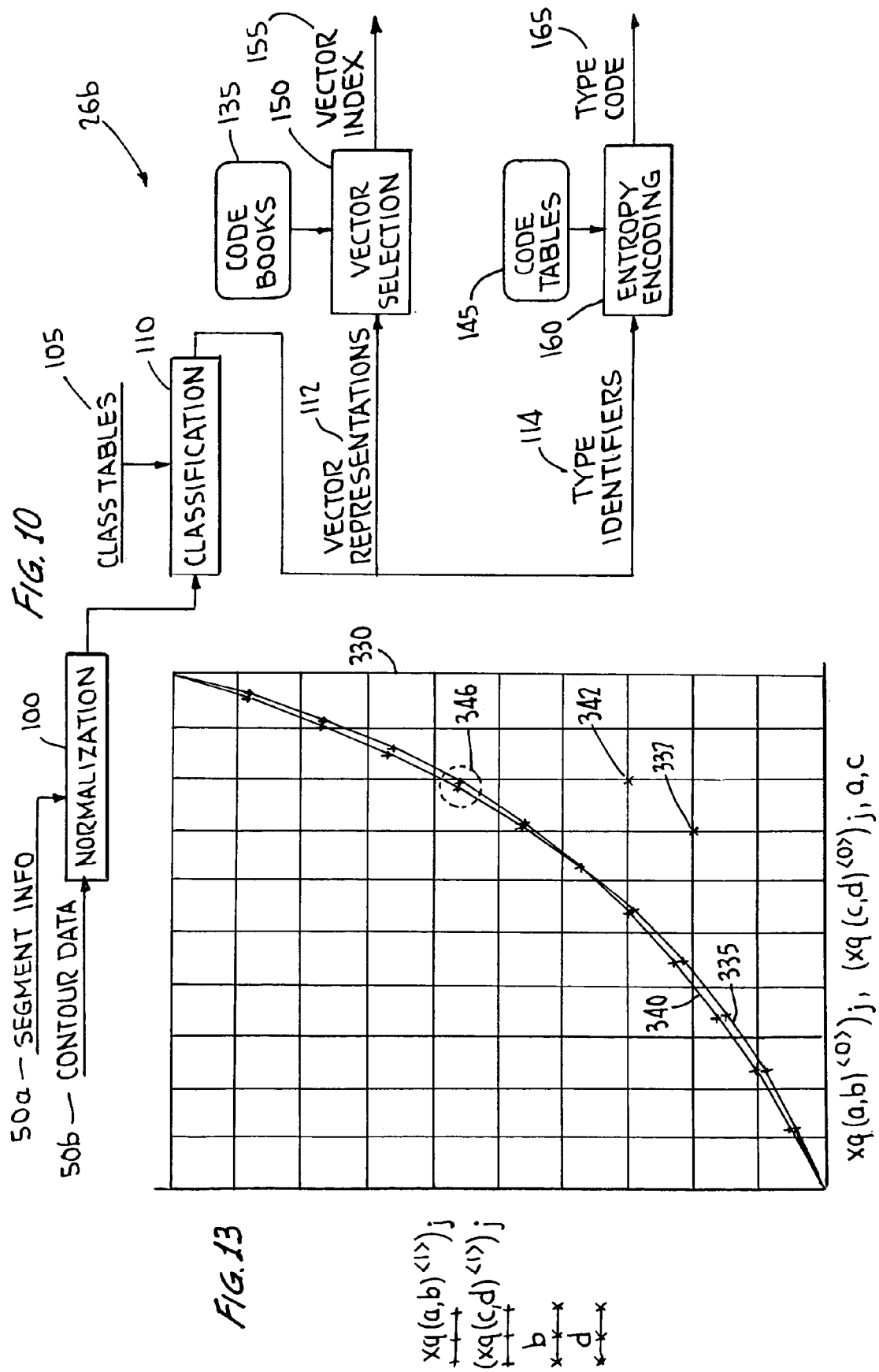

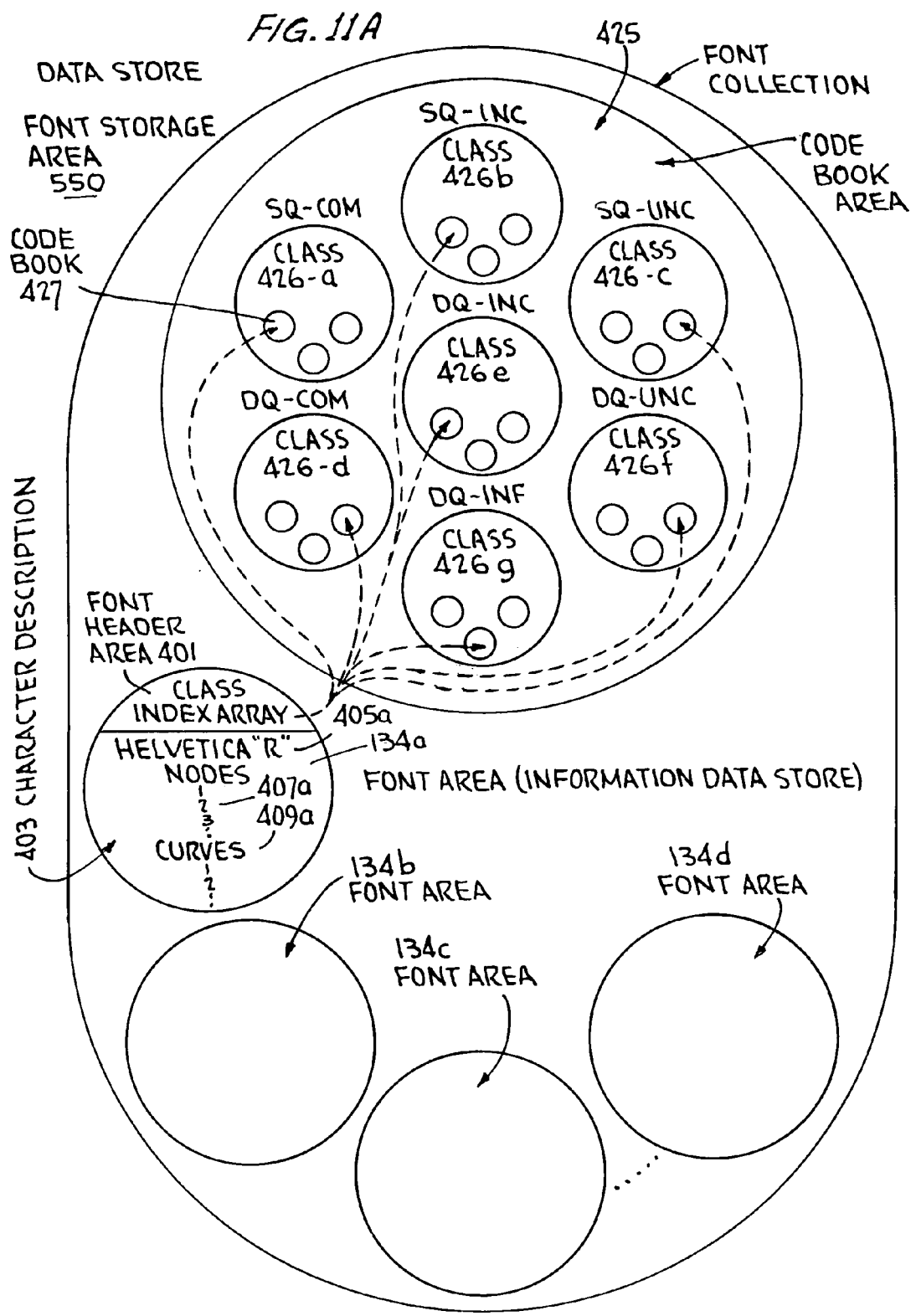

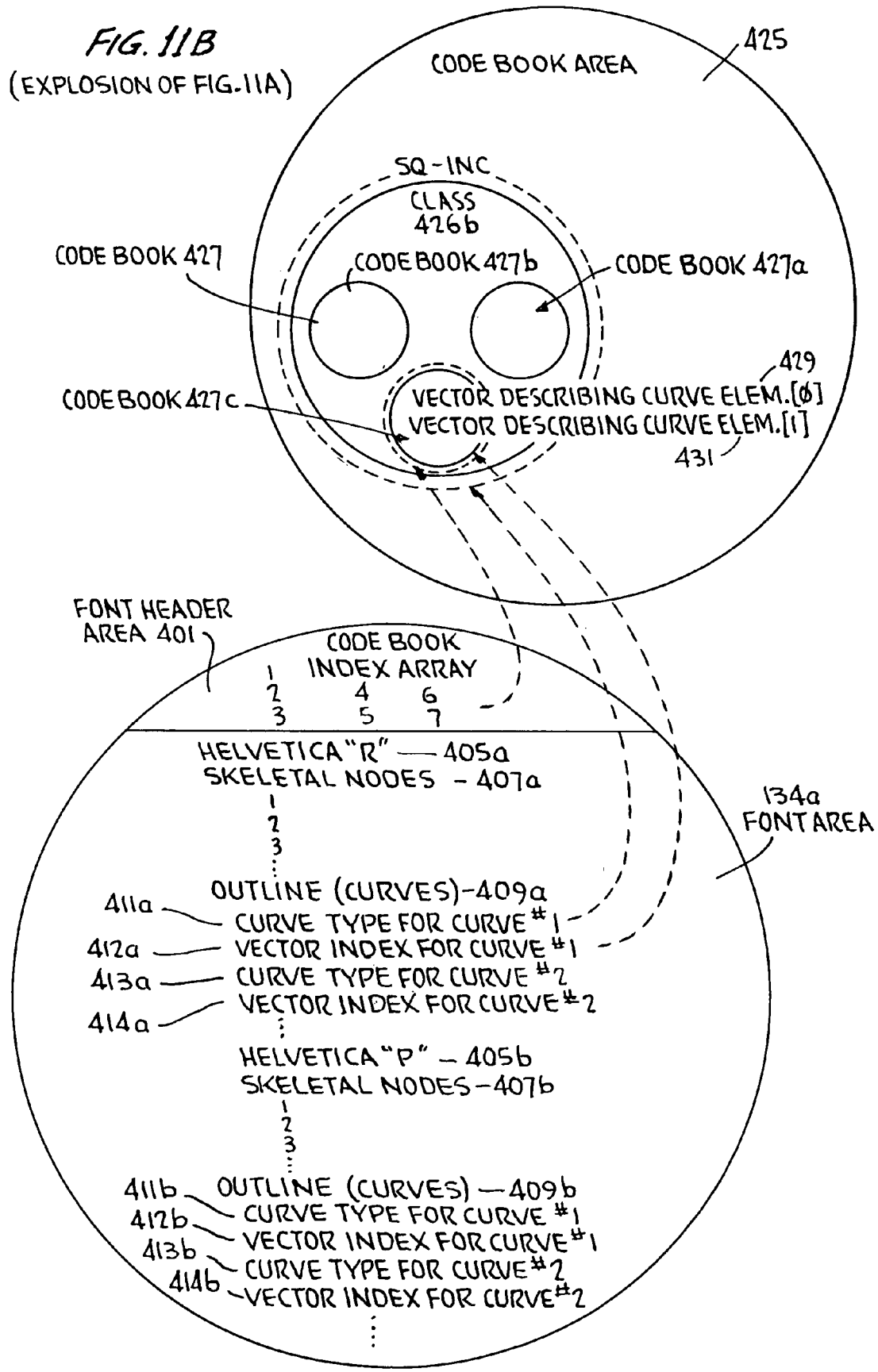

METHOD AND APPARATUS FOR COMPRESSING BEZIER DESCRIPTIONS OF LETTERFORMS IN OUTLINE FONTS USING VECTOR QUANTIZATION TECHNIQUES

RELATED APPLICATIONS

This patent application is a continuation-in-part of application Ser. No. 09/457,549 filed on Dec. 9, 1999 by the same inventor. It is also related to patent application Ser. No. 09/407,381, by Thomas B. Hawkins, filed Sep. 28, 1999, the entire teachings of which are incorporated herein by reference.

BACKGROUND OF THE INVENTION

Computer users expect low latency, high-quality monitor display and printer output, particularly in the area of text fonts. Moreover, since the advent of modern desktop publishing applications operating on personal computers, individuals have been publishing documents in a wide range of fonts.

Storing fonts in computers and laser printers, however, consumes available memory, which results in a trade off between computer memory and the number of available fonts. This trade-off, however, can be mitigated by developments in reducing the storage size of text fonts while maintaining the high-quality output computer users have come to expect.

When an analog version of a letterform is converted to digital form for output on a raster device, for example, there can be a significant loss of important detail due to quantization. For example, storing the digital version in its raster or bitmap form for direct output on a raster device restricts output sizes unless many resolutions are made available, thereby increasing digital data storage requirements.

Several systems (AGFA® Intellifont®, Adobe® Type1™, Apple®/Microsoft® TrueType®) have been developed to deal with this problem by capturing digital letterforms as "scalable outlines" to promote size and resolution independence and by providing "scaling hints" to reduce the negative effects of low resolution rasterization.

The capability of these systems to deliver quality output has led to increased demand by computer/software users for a wider range of typeface designs. As more typefaces have become available, there has been increased interest in methods of font data compression. Systems developed to address this problem fall into two basic categories: font compression by synthesis and font compression by factoring.

Compression by Font Synthesis:

The FontChameleon® font compression technology incorporates one or more "master fonts" and more than 200 typeface design descriptors that reshape the master font to simulate popular typeface designs. Each master font comprises outlines containing, as control points, all required features to define any of the typeface design style variations supported by the master. Scaling hints are algorithmically generated. The actual typeface does not exist until it is synthesized, thereby reducing data storage requirements.

The Infinifont® font compression technology software modules generate basic letterforms which, when fed Panose® typeface classification system descriptors, produces simulations of a variety of popular typeface designs. Again, scaling hints are algorithmically generated as a post process. As with the FontChameleon® font compression technology software modules, the actual typeface does not exist until it is synthesized, thereby reducing data storage requirements.

Compression by Font Factoring:

Careful scrutiny of the data describing a large collection of typefaces reveals a significant amount of redundant information. Removing this redundant information is used to create a more compact, concise data format. This innovative process is called compression by factoring because it is based on the mathematical notion of "factoring" any information that is used repeatedly, storing it once, and sharing it when needed.

Factoring is accomplished at multiple levels by extracting information that is common across varying "cross-sections", or planes, of the total data set. For instance:
1) At the Font Collection Level, information, such as tables that are necessary for each typeface, are stored once, eliminating redundancies, and shared by many of the typefaces (i.e., fonts) in the font collection.
2) At the Typeface Style Level, letterforms have identical topology, and because the scaling hints capture this topology, the same hints are captured in a structure (Model of Associations between Letterform Features) which is applied to each typeface in a given typeface style.
3) At the Typeface Level, common design feature measurements, which are used repeatedly within many characters within that typeface, are extracted, stored once and shared with many characters—examples being y-line heights, stem width, serif lengths, etc.
4) At the individual Character Level, much of the topological information defined in the outline is repeated in the topological information required to capture the scaling hints. By using the topology of the scaling hints to generate the outline, redundant information is eliminated.
5) At the Data Unit Level, within the definition of common typeface measurements (Global Dimensions of Associations), as well as within the definition of measurements specific to a single character (Local Dimensions of Associations), dimension values are mathematically factored to be represented by (i) a common scale factor, which is stored once per typeface, and (ii) a dimension value, whose range is thereby significantly reduced, requiring fewer bits for definition.
6) At the Contour Definition Level, within the definition of contour features specific to a single character (Contour Segment Descriptors), curve control values are ordered and normalized relative to adjacent character features. This reduces the range of their values and likewise reduces data storage requirements.

The basis for compression by font factoring is unique. Where other systems for font compression concentrate on methods to compress the letterform outlines as the primary issue, dealing with the scaling hints as a secondary issue, font factoring deals with the letterform and hints as being two inseparable and indistinguishable components of the letterform essence. In fact, the unique approach to font factoring is that the hints, with all their attributes, are used to give form to the otherwise shapeless letterform outline.

Font compression by factoring has experienced dramatic improvements from skeletal node data factoring on levels 1–5 listed above. However, font compression resulting from outline contour data reduction on the contour definition level (level 6) has not experienced the same level of improvement.

To understand font factoring at the contour definition level, it is important to know some definitions. The outline of the letterforms in outline fonts consists of one or more closed loops called contours. The contours in turn consist of a connected sequence of lines and curves. Lines, that is straight lines, are simple geometric objects that can be easily described in mathematical terms. However, curves, especially long curves, can be rather complex geometric objects that require further subdivision to be tractable in mathematical terms. This is why the curves of a contour are represented by a sequential list of basic pieces of a curve called curve elements. Individual curve elements are easily described by well-known mathematical constructs called Bezier curves. The curve elements and the straight line constitute the contour elements that make up the contours of the outline.

The three general categories of contour elements are the following:

1) Line—A straight line fully defined by its start and end points.
2) Quad—A single quadratic Bezier arc defined by one control point (off the outline) between its start and end points (on the outline).
3) DblQ—A double quadratic are defined by two control points between its start and end points. The connection point of the two quadratic Bezier arcs is the midpoint of the control points.

Each line and curve travels between two points, known as skeletal nodes. A full set of skeletal nodes composes a letterform skeleton, which, when interconnected by appropriate lines and curves, establishes a completed letterform outline. Data representing lines, curves, and skeletal nodes have certain redundant information on many levels, as described above. It is the data representing the lines and curves that are subject to compression on the contour definition level.

SUMMARY OF THE INVENTION

Earlier approaches to contour factoring of segmented outline fonts have inherent limits to the amount of data compression possible. Ordering and normalizing curve control values relative to adjacent character features offers small gains toward contour data compression. Within a single character, there are generally few similar contour contour curves similar enough to factor so as to reduce storage data redundancy to any appreciable extent.

In general, the present invention applies a font factoring technique to compress the outline curve and line data across all characters in a collection of fonts. The curve segments comprising curve elements of the contours are factored into representative curve elements and common references to the representative curve elements. A storage area is used to store the references to the representative curve elements resulting from the font factoring technique More specifically, the present invention includes a method and apparatus for compressing Bezier descriptions of letterforms in outline fonts using vector quantization techniques. The present invention also includes a method and apparatus for decompressing the compressed Bezier descriptions of letterforms. This invention extends to any order polynomial in which the font collection outline data are represented.

In particular, one aspect of the present is a method for font data storage. The method includes defining characters in a font collection using segmented outline forms and storing common references to representative curve elements for similar curve elements composing different contour segments in different characters in different fonts in the font collection. Preferably, the common references and curve elements are stored in a contour segment storage location.

The common references include a vector data index and a vector type index for accessing the representative curve elements. The representative curve elements are stored in an optimized form, including vector data and vector type information. The similar curve elements are normalized then classified into vector representations and type identifiers, which are then separated into font subgroups. The subgroups of vector representations and type identifiers are thereafter processed into code books and code tables, which contain the representative curve elements, represented as the optimized vector data and vector type information corresponding to the code books and code tables information, respectively. The code books are derived from vector quantizing the vector data. The code tables are derived using an entropy encoding process, preferably employing a Huffman entropy encoding scheme.

Another aspect of the present invention is an apparatus for the segmented outline font data storage. The segmented outline forms are stored in a segmented outline font storage. A representative curve element storage is used to store generic curve elements. And, a curve element reference storage includes common references to the generic curve elements. Contour segments of the outline forms correspond to the curve element references, thus the representative curve elements.

The representative curve elements are stored in a normalized form. The representative curve element data and representative type data. The representative curve element data are stored in code books. The representative type data are stored in code tables. The representative vector data are derived by vector quantizing a vector contour point for each curve element. The representative type data are derived by entropy encoding the vector control points, where the entropy encoding preferably employs a Huffman entropy encoding scheme. Font groups having similar segmented outline form characteristics are collected together to improve a ratio of common references to curve elements.

Another aspect of the present invention is a method for segmented outline font data decompression using a font store containing a collection of fonts. The font store comprises a curve element reference storage, which includes curve element references pointing to representative curve elements, and segmented outline forms for font characters. The method comprises steps for generating the font characters including accessing the segmented outline forms of the font characters. The method also includes determining contour segments for the segmented outline of the font characters and accessing the segment reference storage to obtain representative curve elements for representing the contour segments.

The contour segments, made up from curve elements, are scaled to match a requested size for a letterform. Each curve element reference includes at least one vector reference datum and one type code datum. In order to determine the curve elements for the contour segments, curve element vectors for each vector reference datum are looked up in a vector data store (code book), and corresponding segment types for each curve element type datum is decoded from a type data code store (code table). Preferably, decoding a segment type includes applying a Huffman entropy decoding scheme, which matches the Huffman entropy encoding scheme of the font data compression aspect of the present invention.

Another aspect of the present invention is an apparatus for font data decompression for segmented outline fonts. The apparatus includes segmented outline forms defining font characters in a collection of fonts and a segment reference storage area having segment references representing common segmented outline forms for characters in a collection of fonts. The apparatus also includes a curve element storage area comprising curve element data and curve element references providing links to the curve element data. The apparatus also includes a processor routine that accesses the segmented outline forms and curve element references. The processor routine retrieves the curve element references and determines a curve element for each of the segment references. The processor reconstructs the contour segments using the curve elements.

A scaling routine in the processor routine is used to scale the reconstructed contour segments to a size specified by an input associated with an outline form input. A look-up routine bases a search for a vector, stored in a code book, on a vector reference datum included in each curve element reference; a decoder routine bases a decoding/look-up process for a curve element type, stored in a code table, on a segment type datum included in each curve element reference. The decoder routine employs a decoding scheme corresponding to the encoding scheme of the compression process, preferably a Huffman decoding scheme.

An improved reduction over previous contour data compression techniques results from storing the common references to representative curve data tables across multiple characters and multiple fonts, rather than storing curve data for each curve element in each character in each font. In other words, in a direct storage method found in the prior art, character segment coordinate data uses one byte per coordinate for each segment in each character in each font in the entire collection of fonts, minus modest redundancy within single characters. But, in an indirect storage method of the present invention, the reference/index data uses only as many bits as necessary for each coordinate to fully address the size of a table of corresponding curve data for all curve elements in all contour segments in all characters in all subsets of fonts in the collection of fonts. The number of bits for each curve element ranges as low as one bit and as high as seven bits for each axis, as compared to the required eight bits for each axis in the prior art.

The above and other features of the invention, including the various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention.

FIG. 1 is a schematic diagram of a printer, which is one type of computing device to which the present invention applies;

FIG. 3 is a schematic diagram of a font collection 10b depicted in FIG. 2;

FIG. 4 is a character 'd' outline 15b of a font described by quadratic Bezier curves included in the font collection 10b of FIG. 3;

FIG. 5 is a character 'd' outline 15d described by cubic Bezier curves that is optionally included in the font collection of FIG. 3;

FIG. 7 is a block diagram of a first of two passes of the font letterform contour data compression process 20 of FIG. 2 used to compress the font collection of FIG. 3;

FIG. 8B is a table having 7 types, 3 classes, and 2 code books into which the Single Quads of FIG. 8A are classified;

FIG. 10 is a block diagram of a second of two passes of the font letterform contour compression process begun in FIG. 7 to compress the font collection 10b of FIG. 2;

FIG. 11A is a block diagram of the font storage area of FIG. 1 comprising an embodiment of the present invention;

FIG. 11B is a block diagram of the preferred embodiment of the font storage area 30 of FIG. 1, including curves data stores 133, resulting from the two-pass font letterform contour compression process of FIGS. 7 and 10;

FIG. 13 is a plot of two Single Quads, one being a desired letterform single quad and the other being a representative single quad, showing a set of points at which a cumulative error between the two curve elements is measured;

DETAILED DESCRIPTION OF THE INVENTION

Figure 2:
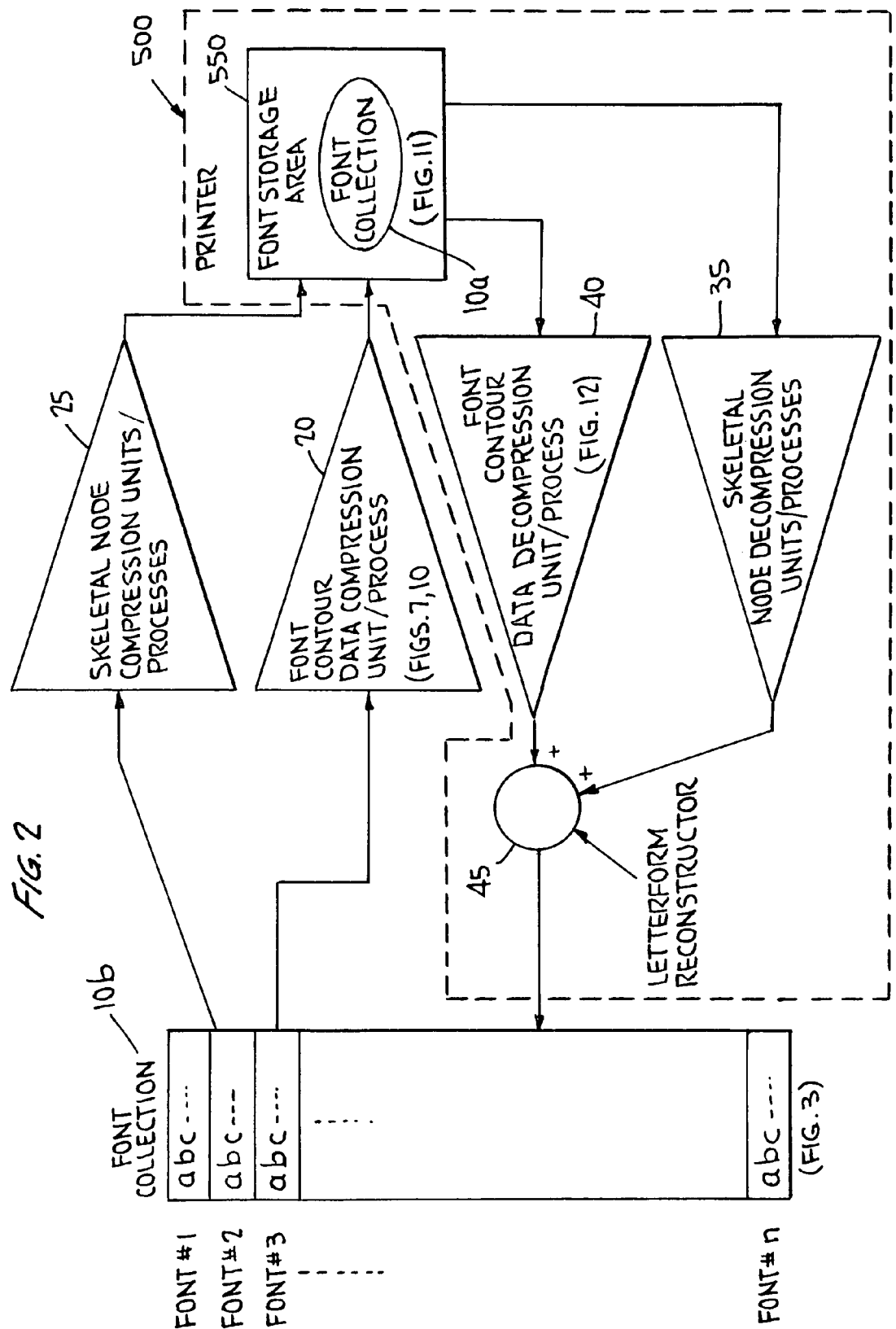
FIG. 2 is a high-level schematic diagram of the present invention having font contour data compression 20, 25 and decompression 35, 40 processes.

FIG. 1 is an example of a device, a printer 500, in which the present invention is deployed. A CPU (central processing unit or processor with associated instruction code) 510 interfaces with a font storage area 550 having a data compressed font collection 10a. The CPU 510 includes processing routines carrying out methods for: receiving print data 560 from a data interface 540, converting the print data 560 into printable text 515 through interaction with the font collection 10a in the font storage area 550, and transmitting the printable text 515 to the print engine 530.

The CPU 510 also interfaces with a paper feed processor 520 to carry out typical print operations. The CPU 510 includes processor routines 512 providing methods for decompressing the font collection 10a and optionally includes processor routines 512 for compressing and storing the font collection 10a.

The printer 500 is typically used in networking environments. In the networking environment, the compression and decompression processes, or portions thereof, are exercised in an external processing area, such as a server. The printable fonts are optionally stored in the font storage area 550, which then acts like a memory cache, after being decompressed by the server.

FIG. 2 is a diagram indicating the relationship of font letterform contour data compression/decompression processes 20, 40 of the present invention with skeletal node font compression/decompression processes 25, 35, which includes font factoring techniques such as model factoring, local dimension factoring, and global dimension factoring (see patent application Ser. No. 09/407,381 incorporated herein by reference). Results from each of the skeletal node compression processes 20, 25 are preferably used to create the compressed font collection 10a, stored in the font storage area 550 in the printer 500. Results from each of the decompression processes 35, 40 re-establish the uncompressed, printable font collection 10b used by the printer 500.

The font collections 10a, 10b include a plurality of fonts: font #1, font #2, font #3, . . . , font #n. Each font includes letterforms having scalable outlines. The letterforms in each font are typical ASCII characters. Each character has defined, segmented contour elements.

The font contour data compression unit/process 20 operates in parallel with the skeletal node font factoring compression units/processes 25 in compressing the outline font data of the font collection 10b. The font contour data compression unit 20 operates on segment information and contour data, which defines attributes of a character contour segment's shape, whereas the skeletal node font factoring compression units 25 operate on hints, nodes, associations, etc., which define the general position of points along and attributes of letterform outlines.

The font contour data decompression unit/process 40 operates in parallel with the skeletal nodes font factoring decompression units/processes 35. Some information, such as end points and scale factors (discussed later) used to return font contour segment elements of the font collection 10a to the proper size and location for reconstruction by a letterform reconstructor 45, is passed to the font contour data decompression unit/process 40 from the skeletal node font factoring decompression units/processes 35 after decompression. The letterform reconstructor 45 includes transformation processing, such as connecting decompressed contour element endpoints, segment positioning, segment scaling, segment rotation, segment mirroring, segment skewing, and reconstructing font letterforms.

FIG. 3 is a block diagram of the uncompressed font collection 10b, which is the input data to the compression processes 20, 25 (FIG. 2). A typical font collection 10b is between 100 and 300 fonts. The font collection 10b is subdivided into font subgroups 12a, 12b, 12c, 12d (collectively 12). Each font in each font subgroup 12 includes characters having similar character features (e.g., bracketed serifs, slab serifs, ball terminals, no (sans) serifs, etc.).

In the second font subgroup 12b is a font 14, such as Helvetica (which has no serifs), that includes standard ASCII characters. The font 14 characters are composed of letterform outlines 15a, 15b, 15c, 15d, which are segmented for purposes of skeletal node font factoring compression 25 and font contour data compression 20 (FIG. 2). Each segment element has segment information 50a and contour data 50b definitions, which are inputs to the font contour data compression process 20.

The subgrouped fonts, based on typeface similarity in visual appearance of their respective contour segments (i.e., flat curves, sharp curves, "squared" curves, etc.), allows for higher compression ratios than if the characters within a given font subgroup were to contain dissimilar typeface features. Grouping fonts together into font subgroups 12 is typically a process performed manually, i.e., by an individual having a broad understanding of font design and compression.

The more similar the characteristics of the letterforms in each of the fonts, the higher the data compression is that may be achieved. Such a font grouping is a Helvetica font family 12b (FIG. 3). On the other hand, the present invention offers some level of compression for dissimilar fonts, such as "Symbol" and "Times New Roman". The mode of operation of the present invention is neither completely "global" nor entirely "sequential". This is because the font block is divided into font groups 12 that bring together fonts of similar design. The compression of one font group is independent of the compression of the next font group. This font grouping approach results in better compression as the effectiveness of vector quantization is maximized because letterforms of similar design tend to have higher concentrations (clusters) of particular features. Thus, font grouping yields better performance.

FIG. 4 is one form of the character 'd' 15d (FIG. 3); in this case, the contour is described by quadratic (as opposed to cubic or higher order) Bezier curves. The character 'd' 15d outline 60a has an outer outline section 62a and an inner outline section 62b, also referred to as contours 62a, 62b. The contours 62 have nodes (e.g., 64a, 64b) and contour curve elements, including lines (e.g., 65a), single quadratics (e.g., 65b) (Quads), and double quadratics (e.g., 65c) (double Quads or DblQ). The line 65a is defined between the pair of nodes 64a, 64b. Other curve elements 65b, 65c are defined by associated nodes, depicted on each side of their associated curve elements 65b, 65c by node indications similar to nodes 64a, 64b.

The DblQ curve element (e.g., 65c) is an interesting construct—also found in other font technologies—because it offers a great deal of flexibility in approximating a curve shape at small cost (one more control point relative to a Quad). In fact, its flexibility is comparable to that of a cubic Bezier curve but without the complexity of a higher degree curve element. These characteristics of the DblQ prove to be very useful for both description compactness and reconstruction facility.

Mathematically, single quads are defined by an equation having a form $x^2+bx+c$. Double quads are defined by equations (two quadratics) having forms $x^2+b_1x+c_1$ and $x^2+b_2x+c_2$. Lines are defined by an equation having a form $ax+b$, i.e., a degenerate form of the quads.

FIG. 5 is another form of the character 'd' 15d; in this case, the contour is described by cubic Bezier curves (as opposed to the quadratic Bezier curves of FIG. 4). The character outline 60b has contours 66a, 66b. The contours 66 have nodes and contour curve elements similar to the character 'd' outline 60a of FIG. 4. Along the contours 66 are nodes (e.g., 68a) having associated "handles" (e.g., 68b). These points and handles 68a, 68b, respectively, are typical font design indicators found in font design software programs, which are useful during a font design process. The font letterform contour data compression and decompression processes 20, 40 (FIG. 2), respectively, are capable of operating on quadratic (FIG. 4), cubic (FIG. 5), or higher order polynomial curve representations.

Figure 6:
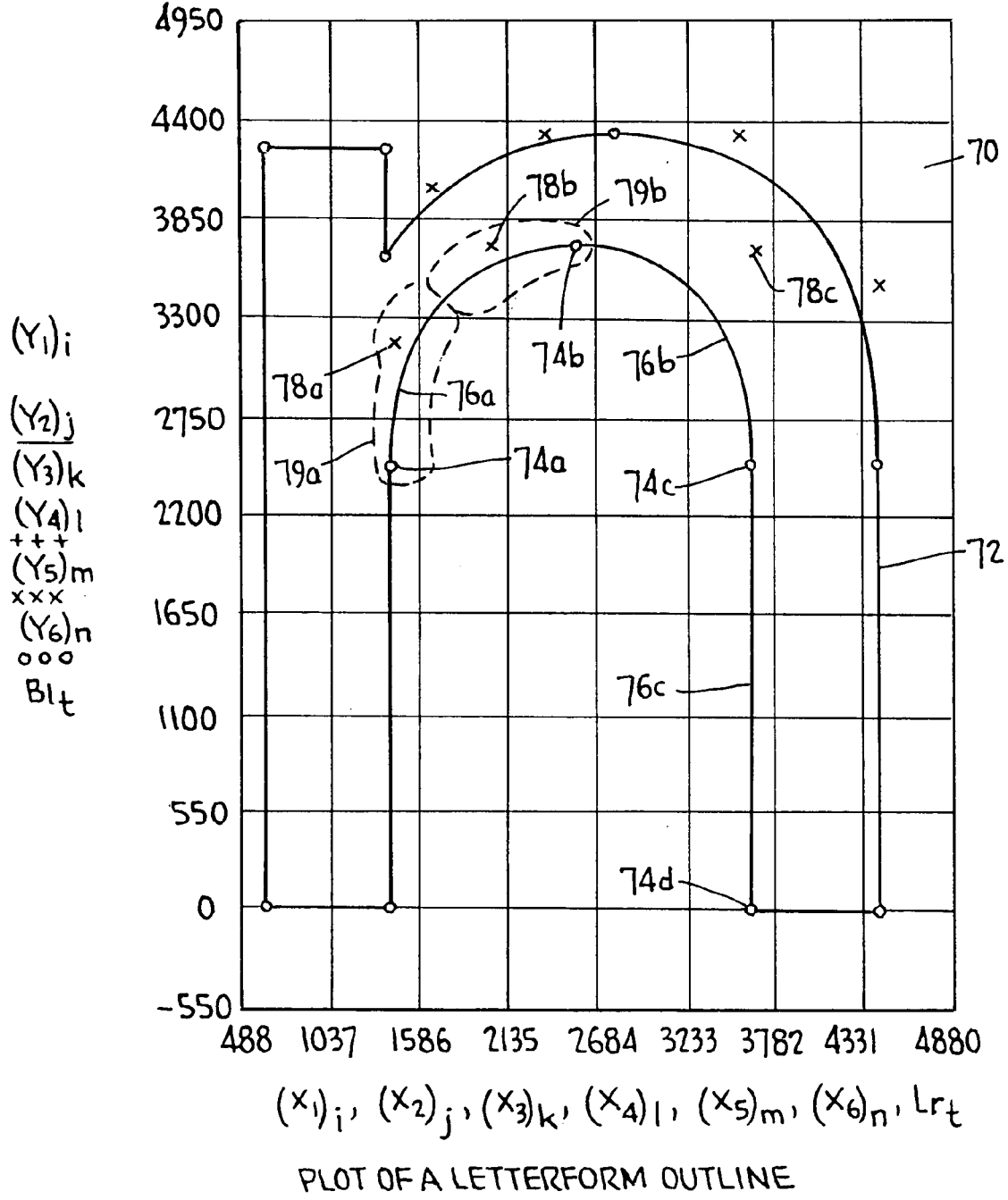
FIG. 6 is an outline of a character 'n' letterform described by quadratic contour elements clearly showing segments, contours, and control points on which the compression process of FIG. 2 operates.

FIG. 6 is an outline of a letterform 'n' 72 described by quadratic curve elements (similar to FIG. 4). A grid overlay 70 illustrates relative sizes of the contour curve elements composing the contours of the letterform. The letterform includes a double quad 76a extending between nodes 74a, 74b; a single quad 76b extending between nodes 74b, 74c; and line 76c extending between nodes 74c, 74d.

The letterform 72 further shows the control points 78a, 78b, and 78c. Control points 78a, 78b represent curve elements 79a, 79b, respectively, of the double quad 76a.

Control point 78c represents the respective curve element single quad 76b. The control points 78 are important to the compression process 20 (FIG. 2) in that each control point is a single point on which the compression process 20 operates, rather than an equation or multiple points representing curve elements 76.

Figure 12:
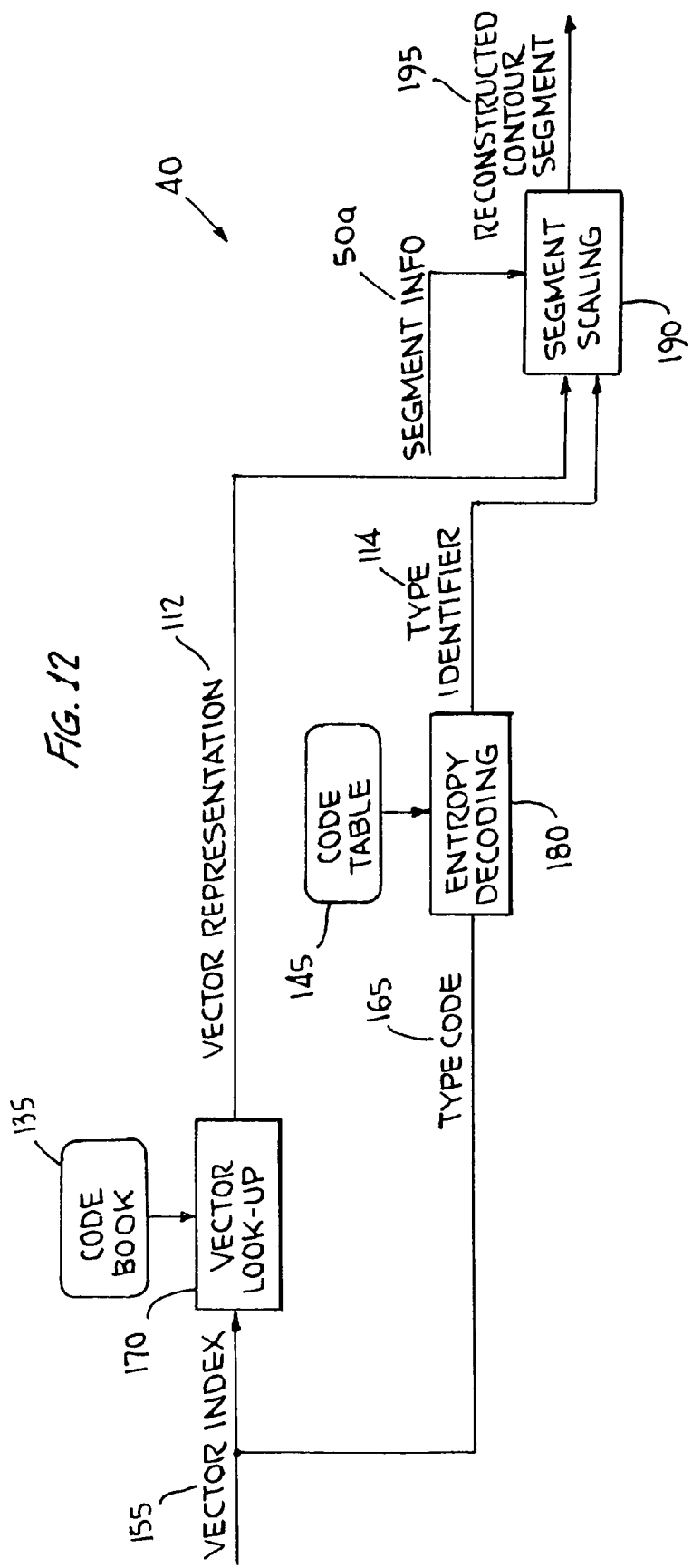
FIG. 12 is a block diagram of a decompression process 40 of FIG. 2 used to decompress the font collection 10b of FIG. 2 compressed by the two-pass font letterform contour compression process of FIGS. 7 and 10.

FIGS. 7, 10, and 12 illustrate the core processing steps of the present invention in detail. FIGS. 7 and 10 correspond to the compression process 20 (FIG. 2), while FIG. 12 corresponds to the decompression process 40 (FIG. 2). Along the main data paths of the block diagrams of FIGS. 7, 10, and 12, flow streams of contour elements from all the outlines in the font block 10a, 10b.

In general, the compression process 20 is depicted as a two-pass process. During the first pass 26a (FIG. 7), the data collection pass, the partially processed contour elements are collected into data sets which, in turn, are quantized and analyzed. It is at this point that the sequential processing of contour elements becomes batch-oriented. In the second pass 26b, the data encoding pass as illustrated in FIG. 10, the contour elements are encoded by applying the code books and code tables produced by the first pass. More detail of the two step process 26a, 26b is discussed below.

FIG. 7 is a block diagram of the first pass 26a of the compression process 20 (FIG. 2). Inputs to the first pass 26a are segment information 50a and contour data 50b, previously discussed in FIG. 3, and shown for specific examples in FIGS. 4–6. Outputs from the first pass 26a are code books 135 and code tables 145, which are input to the second pass 26b (FIG. 10). The segment information 50a and contour data 50b correspond to characters 15 in a font subgroup 12 (FIG. 3). There is typically at least one code book 135 and one code table 145 for each font subgroup 12.

Several processes are applied to perform the transformation from data 50 to reference information 135, 145, namely: normalization 100, classification 110, data collection 120, vector quantization 130, and entropy analysis 140. Two predefined information sources are class tables 105 and a font groups store 115.

The normalization 100 and classification 110 steps are considered part of data collection 120. During normalization 100, the curve element 50 (defined by the segment information 50a and contour data 50b) is scaled to a unit square by mapping its start and end points to diagonally opposing corners of the unit square.

Figure 8A:
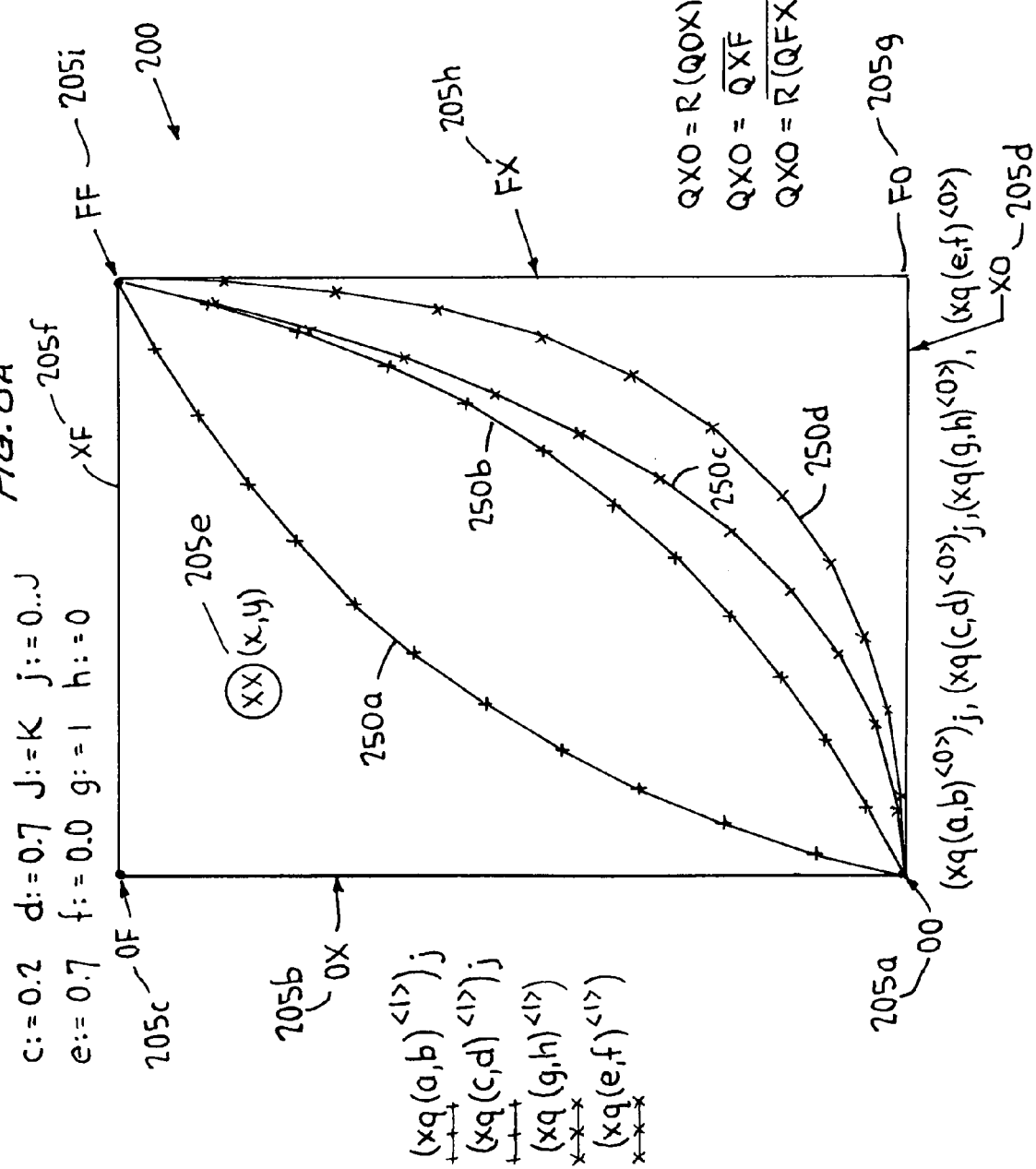
FIG. 8A is a plot of various (in a unit square) Single Quads defining characters in the font collection 10b illustrating the normalization 100 and classification 110 steps of FIG. 7.

FIG. 8A is a plot of various Single Quads 250 and their various corresponding vector representations 205a–205i (collectively 205) on a unit square 200. For the purpose of this discussion, the term vector representation is a two-point vector (x,y) having the same meaning and function as the control points 78a, 78b (FIG. 6). The unit square 200 includes a square grid having two hundred fifty-six divisions in each axis. The normalization process 100 (FIG. 7) includes mapping each curve element of each contour segment of each letterform of each font into the unit square 200. It is assumed that no significant information is lost during the normalization process 100.

In FIGS. 8A, 8B, and the table to follow, references to the maximum normalization value (in this cass 255) is represented as "FF." Conversely, the minimum normalization value is represented as "00." Values between the maximum and minimum values are represented by an uppercase "X."

Referring again to FIG. 7, the classification process 110 maps the normalized curve elements 102 into vector representations 112 and type identifiers 114. The class tables 105 define the various classifications to be used in the classification process 110.

The vector representation 112 (for example, in FIG. 8A, vector representation 205e defining curve 250a) is a vector of normalized coordinates that correspond to the degrees of freedom for the curve element. The type identifier has, besides the generic class, the type of curve element. Classes have different types that complete the taxonomy of the contour elements. The curve element type carries the information regarding the fundamental transformation that the curve element had to undergo in order to be classified as belonging to the given class. These two pieces of information fully describe the curve element's geometry and parameters. Each quad curve is classified according to a respective free parameter, as discussed below in reference to FIG. 8B. Each class has different types according to a required basic transformation to get to the canonical form.

FIG. 8B is an example of a class table 208 used by the classification process 110 (FIG. 7) to classify the single quads 205 (FIG. 8A). Recalling from the FIG. 6 discussion, a control point (e.g., 78c, FIG. 6) represents a curve element (e.g., 76b, FIG. 6). The table of FIG. 5B shows nine possible combinations of control points 205 (i.e., nine rows). If neither x,y component of the control point 206a, 206b has a free parameter, in the cases of (0,0) 205a, (0,F) 205c, (F,0) 205g, (F,F) 205i, the Quad is said to be in a "complete" ("com") class. If only one x,y component of the control point is a free parameter, in the cases of (0,X) 205b, (X,0) 205d, (X,F) 205f, (F,X) 205h, the Quad is said to be in an "incomplete" ("inc") class. If both x,y components of the control point are free parameters, (XX) 205e, the Quad is said to be in an "unconstrained" ("unc") class.

In summary, FIG. 8B shows nine combinations of which seven are legitimate curve types ((0,0) and (F,F), are degenerate combinations, which are eliminated) in three classes (complete, incomplete, and unconstrained). Only the incomplete and unconstrained classes contain variable information that can be vector quantized to produce two corresponding codebooks.

Analysis similar to that shown in FIGS. 5A and 8B (single quads) can be done for double quads or any other curve description. The results of analysis for double quads is as follows. There are eighty-one combinations, of which nine are legitimate curve types (degenerate combinations are eliminated) in four classes (complete, incomplete, inflection, unconstrained). All classes contain variable information that can be vector quantized to produce four corresponding codebooks.

FIGS. 8A and 8B show the different possible single quad types and the classes to which they belong. The following more complete table shows an expanded number of curve types, including double quads. The sq and the dq prefixes in the code book class naming convention refer to a single and double quadratic arc respectively. The second part of the name refers to the acronyms for a complete (com) and incomplete (inc) 90 degree arc sweep; for an inflection (inf) curve, and for an unconstrained (unc) curve element. Finally, the data fetched from the corresponding code book may have to undergo some simple swapping and 256s complement transformations to reconstruct the mirror cases of the different curve elements.

There are 17 segment codes, listed in the following table:

| Segment Code | Data Items | Cbk Class |
| --- | --- | --- |
| lineFF | 0 | — |
| quad0F | 0 | sq_com |

-continued

| Segment Code | Data Items | Cbk Class |
|---|---|---|
| quadF0 | 0 | sq_com |
| quadXX | 2 | sq_unc |
| quad0X | 1 | sq_inc |
| quadX0 | 1 | sq_inc |
| quadXF | 1 | sq_inc |
| quadFX | 1 | sq_inc |
| dq0XXF | 2 | dq_com |
| dqX0FX | 2 | dq_com |
| dq0XFX | 2 | dq_inf |
| dqX0XF | 2 | dq_inf |
| dq0XXX | 3 | dq_inc |
| dqX0XX | 3 | dq_inc |
| dqXXXF | 3 | dq_inc |
| dqXXFX | 3 | dq_inc |
| dqXXXX | 4 | dq_inc |

The number of data items that follow the different curve types refer to the number of X and/or Y coordinate data items. For instance, the arbitrary quadratic arc, quadXX, requires both X coordinate and Y coordinates. However, the 90-degree quadratic arc comes in two types of different convexity, quad0F and quadF0, and does not require any additional information because all its coordinate data are implicit.

There are two ways of specifying the coordinate data. The first one is direct by providing the normalized coordinate data in place, and the second way is indirect by providing an index into the corresponding code book. In the direct way, the coordinate data uses one byte per coordinate data item. In the indirect way, the index data uses only as many bits as necessary to fully address the size of the corresponding code book.

Referring again to FIG. 7, the data collection 120 simply collects the coordinate data, vector representations 112 and type identifiers 114, which compose the "vectors", or data sets 122, to be quantized by vector quantization techniques, including vector quantization 130 and entropy analysis 140 steps. The vector representations 112 are collected by class according to a determined font grouping 12 (FIG. 3). The scheme tries to maximize compression by grouping fonts of similar design (located in a font group store 115) within the font block 10b (FIG. 3) to be compressed. The data sets 122 resulting from this collection step 120 are amenable to compression by vector quantization 130 techniques. Results of the collection process 120 are dramatically illustrated by FIG. 9.

Continuing to refer to FIG. 7, the data sets 122 are processed through the vector quantization 130 and entropy analysis 140 steps. These processing steps 130, 140 are used to determine the code books 135 and code tables 145, respectively. Results from the vector quantization 130 and entropy analysis 140 are delivered to the second pass 26b (FIG. 10) of the compression process 20 (FIG. 2).

Figure 9:
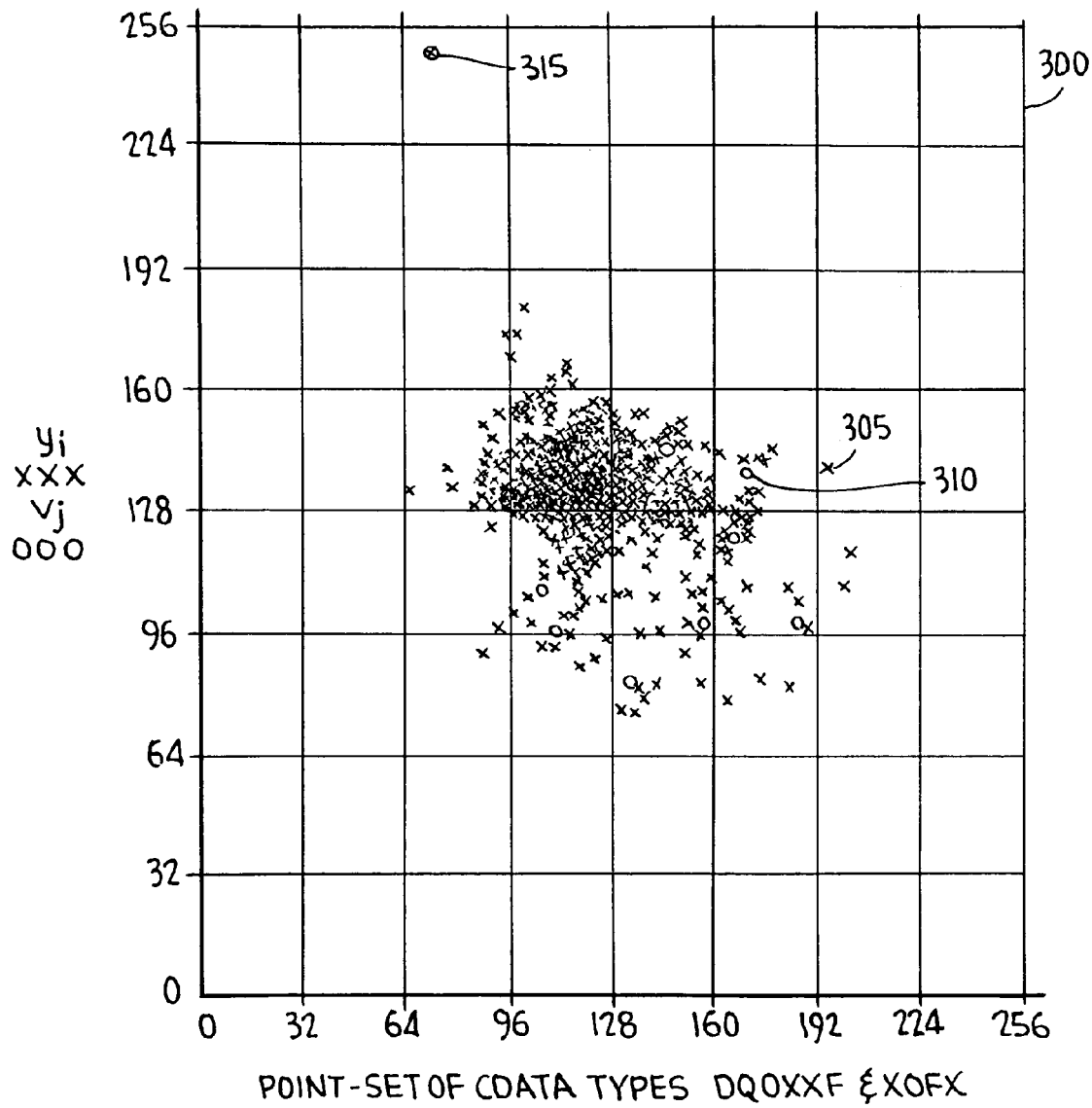
FIG. 9 is a data set plot of vector descriptions illustrating the vector quantization process 130 of FIG. 7.

FIG. 9 is useful for understanding the vector quantization process 130 (FIG. 7). Specifically, FIG. 9 is a data set plot of vector descriptions of a 90-degree double-Quad class (Types dq0XXF & dqX0FX) of contour elements from the alphanumeric letterforms of a single font (CG Times) (see "x" datapoint markers). Note how the data set is reduced from 998 vectors (e.g., 305) to a code book of only 20 representative vectors (e.g., 310) (see "o" datapoint markers). The distortion is quite relaxed with a mean square value of 36, meaning that on average each point is 6 units apart from its representative.

The goal of the vector quantization process 130 is to map each data vector 305 to a representative vector 310 without creating a large distortion measure. Therefore, a "zone" is determined about each representative vector 310, where data vectors 305 located within the zone are mapped to (or references) the representative vector 310.

Vector Quantization:

To further vector quantization understanding, an analogy can be made to color image quantization. In color image quantization, the vector is the triplet (RGB) that represents the color of a pixel in terms of red, green and blue components. To render continuous-tone color images on CRT displays, 24 bits (one byte for each of the primary colors: red, green, blue) are usually used to represent the color of each pixel. Thus, a 24-bit color image of M by N pixels has MN data vectors, and the vector elements are integer numbers in the range of 0–255. Then, the color quantization process consists of choosing a set of K representative colors to approximate the MN colors of an image, where K<MN, such that the resulting K-color image looks as much like the original MN-color image as possible.

Color quantization, as well as the more general vector quantization, is an optimization problem known to be NP-complete in K. The result is a highly compressed version of the original image, but this is not a lossless compression process; the compressed image has some loss of color fidelity.

In the case of font contour data compression, vector quantization is applied to the compression of outline data. The vector is an array of parameters that fully define a particular class of curve element. The three categories of curve elements are defined according to the degree of their parametric polynomial (Line=1st, and Quad=2nd degree), and their compound construction (DblQ=two arcs of 2nd degree). What follows now is a brief explanation of the vector quantization compression technique.

The vector data 124a (collection of all the data vectors) is a set S of N vectors (points): $v_i=(v_{i0}, v_{i1}, \ldots v_{in})$ for I=1 to N, in a nth-dimensional vector space. In vector quantization 130, the point set S is partitioned into K subsets $S_k$ for k=1 to K; with $S_k \neq \emptyset$, $S_j \cap S_k$ for j≠k, and $\cup S_k=S$ for k=1 to K, and where all vectors $v \in S_k$ are mapped to or approximated by, a representative vector $z_k=(z_{k0}, z_{k1}, \ldots z_{kn})$. Through this mapping, an original nth-dimensional data vector is represented by a ($\log_2 K$)-bit integer that is an index into a vector table of K entries (code book), one entry for each representative vector. This simple, indirect addressing mechanism reduces the data storage requirements to be a factor of (data vector bits)/($\log_2 K$).

Mathematically, vector quantization can be formulated as a large-scale clustering problem. The goal is to find the optimal K-partition of the set of S of nth-dimensional vector points to minimize the total quantization error:

$$E(S_1, S_2, \ldots S_k) = \Sigma_{k=1,k}\{(1/|S_k|)\Sigma_{vi, vj \in Sk, I<j}\|v_i, v_j\|\}$$

where $\|v_i, v_j\|$ is a perceptually meaningful vector distance between $v_i$, and $v_j$. The quantization error is defined to be the sum of in-cluster pairwise vector dissimilarities. Note that in the above formulation, the set S is allowed to have duplicate elements to accommodate data sets that contain the same vectors. This relaxed setting eliminates the need of the vector frequency function; hence, it saves a multiplication per vector in evaluating the objective function. There are two important aspects of vector quantization: a meaningful and computable vector measure (norm) $\|v_i, v_j\|$ to quantify visual aesthetics and an efficient algorithm to minimize the quantization error E. Perceptual vector measurement is a challenging problem and requires proper attention in this case. However, if the ubiquitous Euclidean metric is to be used as the vector norm, then vector quantization needs to be performed in a perceptually uniform vector space in which $\|v_i, v_j\|=\|v_j, V_k\|$, if $v_i$ and $v_j$ differ as much as $v_j$ and $v_k$ in visual sensation, and this quantified difference is independent of $v_j$.

Referring again to FIG. 7, an entropy analysis scheme 140 is used to reduce the number of bits necessary to represent the curve type data set, type data 124b. A Huffman entropy scheme is an example of an entropy encoding scheme used by the entropy analysis process 140.

FIG. 10 is a block diagram of the second pass 26b of the compression process 20 (FIG. 2). Like FIG. 7, the segment information 50a and contour data 50b are normalized 100 and classified 110, using class tables 105 (discussed in reference to FIG. 8B). Resulting from the classification process are vector representations 112 and type identifiers 114. At this point in the second pass 26b, the similarity to the first pass 26a (FIG. 7) diverges to create the final results 155, 165 of the compression process 20 (FIG. 2).

The vector descriptions 112 are translated into vector indices by a vector selection process 150. The vector selection process 150 employs the code books 135 created by the first pass 26a (FIG. 7) of the compression process 20 (FIG. 2).

The type identifiers 114 are translated into type codes 165 by an entropy encoding process 160. The entropy encoding process 160 employs the code tables 145 created by the first pass 26a (FIG. 7) of the compression process 20 (FIG. 2).

FIG. 11A is a block diagram of part of the font storage area 550 of FIG. 1 illustrating an embodiment of the present invention. The font storage area 550 has coupled components: a font information data store 134 and a code book area 425.

The code book area 425 comprises seven areas, each one corresponding to one of the defined curve classes: sq_com 426a, sq_inc 426b, sq_unc 426c, dq_com 426d, dq_inc 426e, dq_unc 426f, and dq_inf 426g. Each of the seven class areas 426 contains a set of code books 427, one for each font group 115 used to drive the data collection process 120 (FIG. 7). In turn, each code book 427 contains a list of vectors, allowing different characters' curves to refer to approximations of nearly identical curve elements data 429, 431, rather than storing similar curve element data 429, 431 multiple times in the font information data store 134.

The font information data store 134 includes an Helvetica "R" record 405a and Helvetica "P" record 405b, among other Helvetica characters and non-Helvetica characters not shown. Each record 405a, 405b includes a node field 407a, 407b, respectively, and curve field 409a, 409b, respectively. The curve fields 409a, 409b include curve type specifiers 411a, 413a and indices (to curve definitions) 412a, 414b, etc. collectively vector index 155 and type code 165, respectively, in FIGS. 10 and 12). The indices 412a, etc. refer to the curve definitions 427 in the code books 135 in the code book area 425.

For example, the Helvetica "R" record 405a curve field 409a includes a curve type specifier 411a, which references the single quad incomplete class. The Helvetica code book index array located in the font header area 401 references code book 427c within that class. Finally, the vector index 412 references a curve definition in the form of vector[0] 429 in the code book's 135 curve definition list. Similarly, the Helvetica "P" record 405b curve field 409b includes similar curve type specifiers and vector indices referring to the code books indexed by the code book index array in the font header area 401.

FIG. 12 is a block diagram of the decompression process 40 (FIG. 2). The decompression process 40 restores the compressed font collection 10a to the uncompressed font collection 10b (FIG. 2). The vector index 412 and type code 411 are utilized in generating the decompressed curve, resulting in a reconstructed contour segment 195. The skeletal node decompression process 35 (FIG. 2) provides the end points for contour segment reconstruction.

The vector index 155 is input to a vector look-up process 170. The vector look-up process 170 accesses the code book 135 and retrieves a vector description 112. The vector representation 112 is passed to a segment scaling process 190. The code book 135 corresponds to the font group 12 (FIG. 3) in which the vector index 155 is a member.

The type code 165 is input to an entropy decoding process 180. The entropy decoding process 180 utilizes the code table 145 to determine a type identifier 114. The type identifier 114 is passed to the segment scaling process 190. The code table 145 is the result of the entropy encoding 160 performed on the font group 12 (FIG. 3). The entropy decoding process 180 uses a technique corresponding to the entropy encoding process 160 (FIG. 10). For example, if the entropy encoding process 160 uses a Huffman encoding technique, the entropy decoding process 180 uses a corresponding Huffman decoding technique.

The segment scaling process 190 receives segment information 50a corresponding to the vector index 155 and type code 165. The segment information 50a includes segment endpoints (e.g., nodes 79a, 74b, FIG. 6), between which a contour segment spans (e.g., segment 76a, FIG. 6). The segment scaling process 190 scales the normalized segment, defined by the vector representation 112 and type identifier 114, to span between the segment endpoints contained in the segment information 50a. The result of the segment scaling process 190 (and overall decompression process 40) is the reconstructed contour segment 195. The letterform reconstructor 45 (FIG. 2), reconstructs the entire character outline from a sequence of reconstructed contour segments 195.

FIG. 13 is a plot of two single quads 335, 340 on a unit square 330. The control points 337, 342 represent the single quads 335, 340, respectively. Assuming single quad 335 is a contour segment element and single quad 340 is a representative contour segment element for purposes of vector quantization, then an error is possible to measure (using equations of Error Analysis, listed below) between the two curves 335, 340. The points at which the cumulative error between the two curve elements are measured are distinguished by the crosses 346 along each curve 335, 340.

The following equations show the general mathematical formulae of Bezier curves for a rendition of a quadratic Bezier curve, which apply to all the curves of segment element discussed above, and specifically, for the curves of FIG. 13. A Bezier curve is a parametric curve that uses polynomial functions expressed in terms of a Bernstein basis. In a quadratic Bezier curve, the degree of the polynomial functions is two (2nd degree polynomials).

Error Analysis of a Single Quad Quadratic Bezier Curve:

General Formula of the (n+1) Bernstein Polynomials of $n^{th}$ degree: n:=2

$$B(i, n, t) := \frac{n!}{n-i! * (i!)} * (1-t)^{n-i} * t^i$$

{Pi:=(Xi, Yi)} is the Control Polygon of the curve: a:=0.8 b:=0.3

$X:=0a1^T \ Y:=0b1^T$

An $n^{th}$ degree Bezier Curve is defined as a linear combination of (n+1) Control Points weighted by the Bernstein Polynomials $$x(t) := \sum_{i=0}^{n} X_i * B(i, n, t)$$

$$y(t) := \sum_{i=0}^{n} Y_i * B(i, n, t)$$

Range variables:

m:=32 j:=0 . . . m $S_j$:=j/m K:=12 k:=0 . . . k $u_k$:=k/K

Curve Formulae using standard Bernstein-Bezier "t" parametrization:

$M_{j,i}$:=B(i,n,$t_j$) $M'_{j,i'}$:=B(I',n−1,$t_j$) $M''_{j,i''}$:=B(I'',n−2,$t_j$)

$$sq(a, b) := \begin{vmatrix} P \leftarrow \begin{pmatrix} 0 & 0 \\ a & b \\ 1 & 1 \end{pmatrix} \\ S \leftarrow M * P \\ S \end{vmatrix}$$

$$sq'(a, b) := \begin{vmatrix} P' \leftarrow \begin{pmatrix} a & b \\ 1-a & 1-b \end{pmatrix} \\ S \leftarrow M' * P' \\ S \end{vmatrix}$$

$$sq''(a, b) := \begin{vmatrix} P'' \leftarrow (1-2*a \quad 1-2*b) \\ S \leftarrow M'' * P'' \\ S \end{vmatrix}$$

The amount of error created by the vector quantization process 130 (FIG. 7) is ultimately determined by the amount of "perceived" error a reader visually detects. However, it is useful to quantify error to determine objectively whether improvement is necessary. In other words, in the preferred embodiment, if error is quantifiably too large, additional representative vector points 310 (FIG. 9) are added to achieve less disparity between actual curve elements (e.g., single quad) and representative curve elements.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for font data storage for fonts having segmented outline forms defined by contours having contour segments defined by curves represented by curve elements, the method comprising the steps of:

defining characters in a font collection having segmented outline forms defined; and storing common references to representative curve element segments in a curve element storage location for similar curve elements composing curve segments in different characters of the font collection, wherein the storing further includes mapping the curve elements into vector representations and type identifiers by normalizing start and end points of the curve elements to a unit square and classifying the normalized curve elements using class tables, respectively, collecting the vector representations and type identifiers into data sets of vector data and type data, and applying a vector quantization process to the vector data.

2. The method according to claim 1, wherein the common references include a vector data index and a curve type code to access the representative curve elements.

3. The method according to claim 1, wherein the step of storing further includes the steps of:

employing an entropy analysis process to the type identifiers, wherein the vector quantized data is stored as an entry in a code book and the data resulting from entropy analysis is stored as a type codification table.

4. The method according to claim 3, wherein the step of storing further includes the steps of:

for each vector representation, selecting a vector index referencing a code book entry having a representative vector representation; and for each type identifier, applying an entropy encoding scheme by selecting a type code from the type codification table.

5. The method according to claim 4, wherein the entropy analysis and encoding processes use a Huffman entropy process.

6. The method according to claim 1 further including the step of subgrouping the font collection into font groups having similar segmented outline form characteristics.

7. An apparatus for font data storage for fonts having segmented outline forms defined by contours having contour segments defined by curves represented by curve elements, the apparatus comprising:

a segmented outline font storage for storing segmented outline forms for characters in a font collection;

a representative curve element storage for storing representative curve elements; and, a curve element reference storage having common references to the representative curve elements, including curve type codes and representative vector data, wherein the representative vector data is derived by vector quantizing vector description data for all curve elements of a same class.

8. The apparatus according to claim 7, wherein the representative curve elements are stored in a normalized form.

9. The apparatus according to claim 7, wherein the representative curve elements include representative vector data stored in code books.

10. The apparatus according to claim 7, wherein:

the type codes are derived by entropy analysis of all the curve type elements of the font group.

11. The apparatus according to claim 10, wherein the entropy encoding uses a Huffman entropy encoding scheme.

12. The apparatus according to claim 7 wherein font groups having similar segmented outline form characteristics are collected together to improve a ratio of representative curve references to actual curve elements.

13. A method for font data decompression using a font store containing a collection of fonts, the font store comprising a curve element reference storage and segmented outline forms for font characters, the method comprising the steps of:
   generating the font characters by accessing the segmented outline forms of the font characters;
   determining contour segments for the segmented outline of the font characters; and
   accessing the curve element reference storage to obtain representative curve elements composing the contour segments;
   wherein each curve element reference stored in the curve element reference storage includes at least one vector reference datum and one curve element reference datum, wherein the vector reference data refers to curve element vectors stored in a code book obtained via vector quantization, and wherein the curve element data refers to curve element types specified in a code table.

14. The method according to claim 13, wherein the step of accessing includes the step of scaling the contour segments.

15. The method according to claim 13, wherein the step of accessing includes:
   looking up a vector stored in the code book for each vector reference datum; and
   decoding a segment type stored in the code table for each segment type datum.

16. The method according to claim 15, wherein the step of decoding includes applying a Huffman entropy decoding scheme.

17. An apparatus for font data decompression using a font store containing a collection of fonts, the font store comprising a curve element reference storage and segmented outline forms for font characters, the segmented outline forms having contour segments represented by curve elements, the apparatus comprising:
   segmented outline forms defining font characters in a collection of fonts;
   a curve element storage area comprising curve element data and curve element references providing links to the curve element data, wherein each curve element reference includes at least one vector reference datum and one segment datum; and
   a processor routine accessing the segmented outline forms and curve element references, the processor routine retrieving the curve element data corresponding to the curve element references for reconstruction of the contour segments composing the segmented outline forms, the processor routine including a look-up routine for looking up a vector stored in a code book obtained via vector quantization for each vector reference datum.

18. The apparatus according to claim 17, wherein the processor routine includes a transformation process comprising at least one of connecting, positioning, scaling, rotation, mirroring, skewing, and reconstructing.

19. The apparatus according to claim 17, wherein the processor routine includes:
   a decoder routine for decoding a curve element type stored in a code table for each segment type datum.

20. The apparatus according to claim 19, wherein the decoder routine performs a Huffman entropy decoding scheme.

* * * * *